June 2, 1942.　　　M. H. NIELSEN　　　2,284,676
METHOD AND MACHINE FOR ASSEMBLING WASHERS WITH SCREW THREADED FASTENERS
Filed Oct. 21, 1940
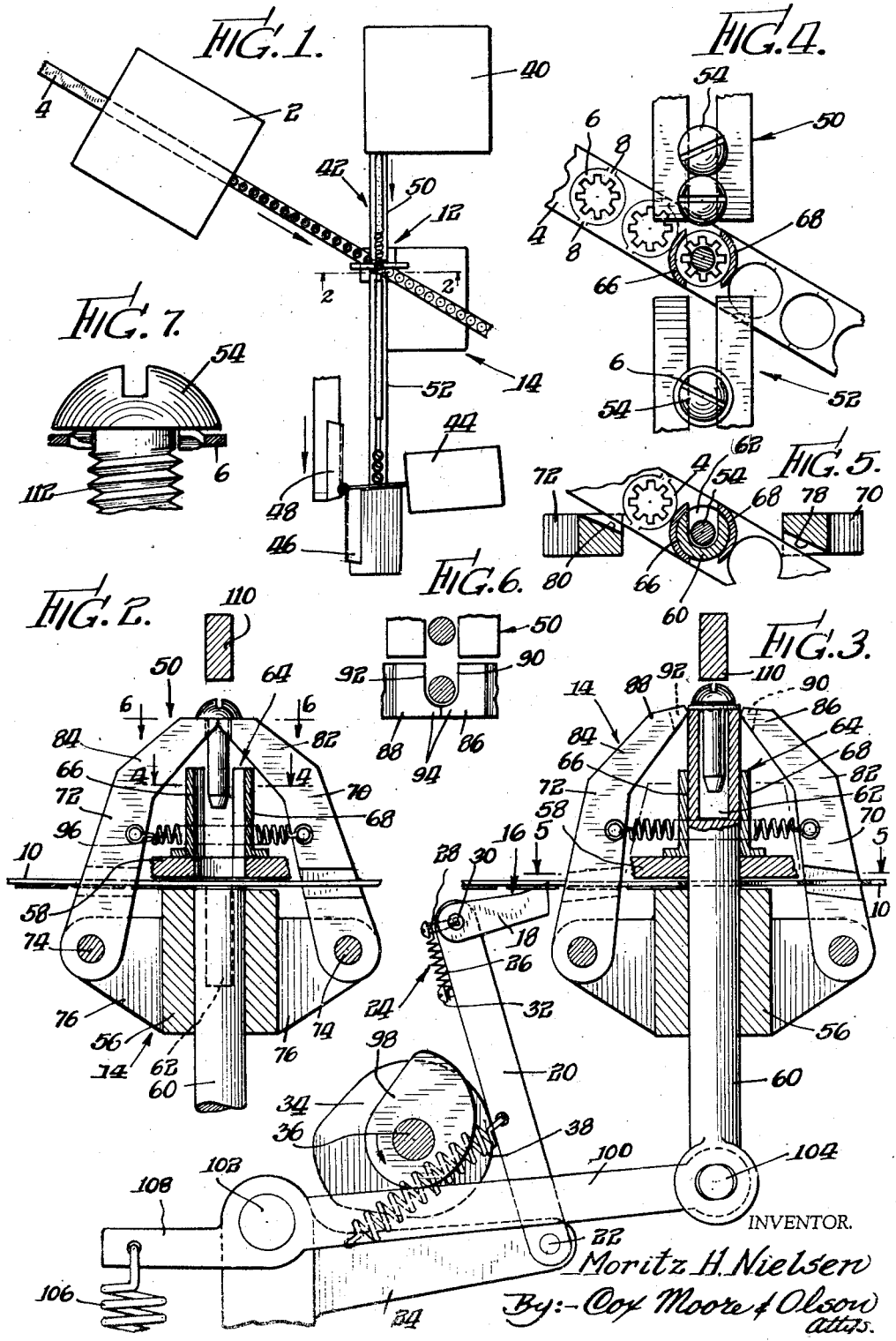
INVENTOR.
Moritz H. Nielsen
By: Cox Moore & Olson
attys.

Patented June 2, 1942

2,284,676

UNITED STATES PATENT OFFICE 2,284,676

METHOD AND MACHINE FOR ASSEMBLING WASHERS WITH SCREW THREADED FASTENERS

Moritz H. Nielsen, Chicago, Ill., assignor to Illinois Tool Works, Chicago, Ill., a corporation of Illinois Application October 21, 1940, Serial No. 362,086

23 Claims. (Cl. 10—2)

This invention relates to a method and machine for producing, as an article of manufacture, a unit assembly of a threaded fastener and a washer, particularly a screw and lock washer.

It is an object of this invention to devise a simplified and high speed method and machine for assembling fastener elements with washers.

The invention contemplates the provision of a method of producing, as an article of manufacture, a unit assembly of a fastener element, such as a screw or nut, and a washer in which a strip of washer material is fed to a predetermined point at which a washer is punched or detached from the strip and simultaneously telescoped with a fastener or screw element, and the fastener elements of the temporarily assembled units then subjected to an enlarging or other upsetting operation to retain the fastener elements or screws and washers in permanently assembled relation.

A further object of the invention is to provide a method and machine by which a strip from which washers are formed may be used to convey the washers to an assembly point, and the washers removed from the strip and simultaneously telescoped with threaded fasteners brought to this point.

More specifically, it is an object of applicant's invention to devise a method and machine for making or assembling threaded fastener elements, such as screws, with washers, particularly lock washers, which shall permit and provide a continuous supply of washers to an assembly point, thereby making possible an increase in the rate at which such assembled units are produced.

Other and further objects and advantages of the invention will be apparent from the following description when taken in connection with the accompanying drawing, wherein Figure 1 is a diagrammatic view illustrating a machine embodying my invention;

Figure 2 is a fragmentary view, in generally vertical section, taken along the line 2—2 of Figure 1;

Figure 3 is a view similar to Figure 2, with the parts in a different position of operation;

Figure 4 is a fragmentary view, in generally horizontal section, taken along the line 4—4 of Figure 2;

Figure 5 is a fragmentary view, in generally horizontal section, taken along the line 5—5 of Figure 3;

Figure 6 is a view, in generally horizontal section, taken along the line 6—6 of Figure 2; and Figure 7 is a fragmentary view in elevation and partly in section of a unit assembly of a screw and a lock washer produced by the method and machine of my invention.

Washers are commonly formed from a strip of metal by a punching or stamping operation, utilizing a stamping die of the form or configuration required by the form and configuration of the washer to be produced. Punch presses or stamping machines for this purpose are well known. Such a machine is indicated by the general reference numeral 2 in Figure 1.

A strip of metal 4, of the necessary width and thickness to form washers of the desired size and shape, is fed usually from a roll into the machine 2, and during its passage through the machine a stamping die or dies form the washers and cut the same from the strip, the washers being received in a suitable pan or receptacle, and the strip being passed from the machine to a take-up roll or being cut off by the operator from time to time.

In using this machine as a unit of a larger machine for making assembled screw and washer units, the washer-forming or stamping dies are provided with small depressions in the cutting edges so as to leave the washers attached to the strip by one or more relatively thin ears or pieces so that they will be fed with the strip as it leaves the machine 2. Thus, in the case of internal tooth lock washers 6 (Figure 4), the stamping dies are so formed that each washer is attached to the strip from which it is formed by one or more small ears or pieces 8 (Figure 4), while being otherwise free from the metal strip 4 from which the washer is formed. In the case of external tooth lock washers, one or more of the teeth are left connected to the strip in easily severable condition by small ears or pieces similar to the ears or pieces 8.

From the washer-forming machine or punch press 2 the metal strip, with the washers formed but not completely severed therefrom, is fed to an assembly station 12 (Figure 1) at which the assembly mechanism 14 in one operation severs the washer from the strip and telescopes it onto the shank of the screw element.

The metal strip 4 may be fed to the assembly station by the strip feeding device forming part of or an auxiliary to the washer-forming machine or punch press 2, or it may be fed to the assembly station from the punch press by feed mechanism 16 (Figure 3). As shown in Figure 3, this feed mechanism 16 may comprise a pawl 18 pivoted to the upper free end of a lever 20, in turn pivoted at its lower end, as by the pin 22, to a fixed bracket 24.

The pawl 18 is normally urged upwardly into the washer aperture of the strip 4 by suitable spring means 24 as, for example, by a coil spring 26 secured at one end to a pin 28 fastened to the pivot pin 30 to which the pawl 18 is also secured, the spring 26 being anchored at its other end to a pin 32 fixed to the lever 20. The lever 20 is intermittently swung in a clockwise direction, as seen in Figure 3, to feed the strip 4 to the right a distance equal to the distance between the centers of adjacent washers, as by a cam 34 secured to a continuously rotating drive shaft 36. As the lever 20 swings in a clockwise direction, the nose of the pawl 18 engages the inner edge of the washer into which the pawl is projected by the spring 26 and thereby feeds the strip 4 forwardly.

The lever or a cam engaging lug (not shown) carried by the lever is held in engagement with the cam and the lever returned in a counterclockwise direction by suitable spring means, as, for example, by a coil spring 38 secured at one end to the lever and at the other end to the bracket 24 or other stationary part. The spring 26 permits the pawl 18 to move or pivot downwardly and move along the under surface of the strip 4 as the lever 20 moves in a counterclockwise direction to position the pawl with respect to the succeeding washer aperture.

The screw blanks may be fed to the assembly station 12, and the temporarily assembled screw and washer units fed from the assembly station to the thread rolling mechanism by the standard or conventional screw thread rolling machine such as shown in Richard Lester Wilcox United States Patents No. 1,584,263, dated May 11, 1926, and No. 1,798,919, dated March 31, 1931. Such a standard thread rolling machine comprises, as diagrammatically shown in Figure 1, a hopper 40 in which screw blanks are dumped en masse and from which, by suitable mechanism, the screw blanks are supplied to an inclined gravity feed chute 42. In these standard screw thread rolling machines a transfer mechanism 44, at the lower end of the chute 42, feeds the foremost screw blank at the lower end of the chute to thread rolling dies 46 and 48, of which the die 46 is stationary and the die 48 reciprocates so that the shank of a screw element positioned with its head bridging the space between the dies is, by the reciprocating movement of the die 48, rolled forwardly between the dies and a thread extruded thereon.

In adapting this standard screw thread rolling machine to the manufacture of assembled screw and washer units, the inclined gravity feed chute 42 has a portion thereof cut away at the assembly station 12, as shown in Figure 4, thereby dividing the chute 42 into an upper section 50 feeding the screw blanks 54 to the assembly station, and a section 52 feeding the assembled screw blank and washer units from the assembly station to the transfer mechanism.

The screw thread rolling machine and the washer forming or punch press machine 2 are relatively so disposed that the strip 4 is fed at a horizontal angle to the inclined chute 42 so that it passes through the space between the chute sections 50 and 52 at such an angle that it will not interfere with the operation of the assembly mechanism 14, as will presently be made more apparent.

At the assembly point the strip 4 passes between a stationary supporting and guiding block 56 and a washer die block 58 having an opening therein and conforming in size and shape to the external configuration of the washer. The assembly mechanism 14 comprises a punch or plunger 60 slidably mounted in the block 56 and having a longitudinally extending slot 62 in its upper portion to receive the shank of the screw blank 54.

The external diameter of the upper portion of the plunger is substantially equal to the external diameter of the washer 6, and the plunger, at its upper edge, may, if desired, be formed with a suitable plurality of recesses, or a single annular recess, to receive the twisted teeth of the lock washers so that there will be no warping of the teeth by the action of the plunger, since the external diameter of the plunger, at least in its upper portion, is equal to the diameter of the washers. The die block 58 also forms a guide for the punch or plunger 60.

The plunger, as it moves upwardly, severs a washer positioned at the assembly station from the strip and carries it upwardly along a washer guide 64 which may comprise arcuate strips 66 and 68 fastened to the block 58 or other suitable stationary part and forming a cylindrical guiding surface of an internal diameter equal to the external diameter of the washers. The arcuate members 66 and 68 are made of such arcuate extent as to form between their corresponding edges openings aligned with the space between the guide bars of the guide chute sections and sufficient to permit ready passage of the shanks of the screw blanks between the guide members 66 and 68. If desired, the guide 64 may be formed of a hardened steel tube slotted diametrically to provide such openings for the passage of the shanks of the screw blanks. The guide 64 may be permanently attached to the die block 58, for when a die block of one size or type is substituted for another of a different size or type, the guide 64 must also be replaced by one of a different size.

Screw blanks which are fed to the assembly station 12 along the guide chute section 50 are held at the assembly point by a pair of oppositely shiftable jaw members or stops 70 and 72 pivoted at their lower ends, as by pins 74, to brackets 76 which may be formed integrally with the guide block 56. The jaw members 70 and 72 swing at right angles to the path of movement of the screw blanks and may be cut away or notched, as at 78 and 80 (Figure 5), to accommodate the washer strip 4 between the jaw members when the latter are in their closed position, as shown in Figure 2.

The jaw members 70 and 72 are formed with converging upper arm portions 82 and 84 providing at their upper ends relatively thin jaws 86 and 88. The jaws 86 and 88 are formed along their meeting edges with complementary recesses 90 and 92 forming an opening for receiving the shank of a screw blank, with the head of the screw resting upon the upper surface of the jaws. The notches 90 and 92 extend only partially through the jaws 86 and 88 so as to provide complementary abutting projections 94 which prevent the received screw blank from moving through the closed jaw.

When the jaw members are in closed position, as shown in Figure 2, the upper edge surface of the jaws 86 and 88 lies in the same common plane with the upper edges or surfaces of the guide bars of the chute section 56 so that the foremost screw blank in the chute section 50 will readily gravitate into the jaw members. Spring means such as a coil spring 96, secured at its opposite ends to the jaw members 70 and 72 above the pivot pin 74, normally urges the jaw members to closed position.

The punch or plunger 60 is intermittently operated in properly timed relation with feeding of the strip 4 as by a cam 98 secured to the shaft 36 which drives the cam 34 and operates a lever 100 pivoted as at 102 to the bracket 24, the lever 100 having a slot and pin connection 104 with the punch or plunger 60. The lever 100 or cam lug carried by the lever is maintained in engagement with the cam 98, and the plunger moved upwardly by spring means such as a coil spring 106 secured at one end to arm 108 of the lever and at its other end to a suitable fixed part.

The standard screw thread rolling machine, such as shown in the Wilcox patents previously noted, embodies a cover bar for the chute 42 which overlies the space between the guide bars of the chute and is adjustably mounted so that it may be spaced above the chute a distance sufficient to accommodate the heads of the screw blanks being fed, while at the same time preventing the screw blanks from falling out of the chute. Such a cover bar for the chute is indicated by the reference numeral 110 in Figures 2 and 3. It should be noted that this cover bar extends over the space between the guide chute sections 50 and 52 and is utilized to hold the screw blank against substantial upward movement during the assembly operation, as shown in Figure 3.

In accordance with the present method, the washers 6 are formed or stamped in the punch press 2 and are not completely severed from the strip 4, being left connected thereto by one or more small ears 8. The strip 4, being intermittently fed, carries the attached washers in succession to the assembly station at which a washer to be assembled with the screw is positioned over the plunger or punch 60 in vertical alignment with the aperture in the die block 58, the washer guide 64 and the shank of the screw blank held in the jaw members 70 and 72. Screw blanks are fed from the mass in the hopper 40 to the assembly station in individual succession by the upper chute section 50, and the foremost screw blank, under the weight of the screw blanks thereabove, gravitates into the jaw members 70 and 72.

The plunger or punch 60 is now moved upwardly under the action of the spring 106 and under the control of cam 98 so that the washer is first severed from the strip 4, carried upwardly along the cylindrical surface of the guide 64, and telescoped onto the shank of the screw blank. As the washer approaches the head of the screw blank it engages the under or cam-like edges of the converging arm portions 82 and 84 of the jaw members 70 and 72, and the continued upward movement of the washer therefore cams the jaw members apart to the position shown in Figure 3.

During the telescoping of the washer onto the screw, the screw may move upwardly a sufficient distance to clear the upper surfaces of the jaws as they swing apart, and further outward movement of the screw blank is prevented by the cover bar 110.

The washer having been positioned in close juxtaposition to or in abutting relation with the head of the screw blank, the cam 98 now causes the punch or plunger to move downwardly and release the screw blank. While the jaw members are still separated, the weight of the screw blanks in the upper section of the guide chute forces the screw at the assembly station to pass from the assembly station onto the lower section of the guide chute, and the jaw members 70 and 72 are closed by the spring 96 to catch the next screw blank and hold it in position at the assembly station.

The assembled screw and washer elements gravitate down the lower section 52 of the guide chute to the transfer mechanism 44 and are fed in individual succession to the thread rolling dies 46 and 49, which thereupon extrude a thread 112 upon the shank of the screw blank, which thread is of an external diameter greater than the internal diameter of the washer, and the extruded thread therefore holds the washer in permanently assembled relation with the screw. Assembled units discharged from the thread rolling dies may be received in any suitable receptacle, such, for example, as the article receiving pan of a standard thread rolling machine.

It will be seen that by this method and mechanism a single washer is invariably fed to the assembly station and each arrives at the assembly station in precisely the same position.

Although the invention has been illustrated as adapted for the assembling of washers with screw elements, it will be apparent that the invention may be adapted for the production and assembly of other threaded fastener elements providing a surface beneath the washer which may be extruded or upset to retain the washer after it has been assembled with the fastener element.

It will be further seen from the preceding description that applicant has provided a simplified and high speed method and machine for assembling fastener elements with washers.

Applicant has further provided a method of producing, as an article of manufacture, a unit assembly of a fastener element, such as a screw, and a washer in which a strip of washer material is fed to a predetermined point at which a washer is punched or detached from the strip and simultaneously telescoped with a fastener or screw element, and the fastener elements of the temporarily assembled units then subjected to an enlarging or upsetting operation to retain the fastener elements or screws and washers in permanently assembled relation.

Applicant has further provided a method and machine by which a strip from which washers are formed may be used to convey the washers to an assembly point, and the washers removed from the strip and simultaneously telescoped with screws brought to this point.

Applicant has further provided a method and machine for making or assembling threaded fastener elements, such as screws, with washers, particularly lock washers, which shall permit and provide a continuous supply of washers to an assembly point, thereby making possible an increase in the rate at which such assembled units are produced.

Changes may be made in the method or in the form, construction and arrangement of the parts without departing from the spirit of the invention, and the right is hereby reserved to make all such changes as fairly fall within the scope of the following claims.

The invention is hereby claimed as follows:

1. A method of making unit assemblies of a threaded fastener and a washer, comprising feeding a washer strip to an assembly station, at the assembly station successively punching washers from the strip and telescoping the washers with fastener elements at the assembly station, and upsetting portions of the washers and fastener elements in juxtaposition to the free face of the washers to retain the fastener elements and washers in assembled relation.

2. A method of making unit assemblies of a threaded fastener and a washer comprising feeding a strip with washers attached thereto in predetermined spaced relation to an assembly station, at the assembly station successively detaching the washers from the strip and simultaneously telescoping a detached washer with a fastener element at the assembly station, and upsetting portions of the fastener elements beyond the free faces of the washers to retain the fastener elemnts and washers in assembled relation.

3. A method of making unit assemblies of a headed fastener element and a washer comprising feeding to an assembly station a strip of washer material with washers formed therein and partially attached thereto, at the assembly station punching the washers from the strip and simultaneously telescoping the washers with headed fastener elements at the assembly station so that the washers are positioned adjacent the heads of the fastener elements, and upsetting portions of the fastener elements beyond the free faces of the washers to retain the header fastener units with washers in assembled relation.

4. A method of making unit assemblies of a threaded fastener element in a washer comprising partially forming washers in a strip of washer material, feeding the strip to an assembly station, at the assembly station forming the remaining portion of each washer and simultaneously telescoping the washer with a fastener element at the assembly station, and upsetting portions of the elements beyond the free faces of the washers to retain the fastener elements and washers in assembled relation.

5. A method of making unit assemblies of a fastener element and a washer, comprising forming washers in a strip of washer material with an outer edge portion of each washer partially secured to the strip, feeding the strip to an assembly station, at the assembly station severing the partially secured edge portion of each washer from the strip and simultaneously telescoping the washer with a fastener element at the assembly station, and upsetting portions of the fastener elements beyond the free faces of the washers to retain the fastener elements and washers in assembled relation.

6. A method of making unit assemblies of a headed fastener and a washer, comprising intermittently feeding an elongated washer strip to an assembly station, at the assembly station successively punching washers from the strip while at rest and telescoping the washers with fastener elements at the assembly station and upsetting portions of the fastener elements beyond the free faces of the washers to retain the fasteners and washers in assembled relation.

7. A method of making unit assemblies of a screw and a washer comprising feeding a washer strip to an assembly station, at the assembly station punching washers from the strip and simultaneously telescoping the washers with screw elements at the assembly station and enlarging the shanks of the screw elements beyond the free faces of the washers to retain the screws and washers in assembled relation.

8. A method of making unit assemblies of a screw and a washer, comprising feeding a washer strip to an assembly station, feeding screw blanks to the assembly station, at the assembly station punching washers from the strip and simultaneously telescoping the washers with the screw blanks at the assembly station, and while the washers are maintained in temporarily assembled relation with the screw blanks rolling a thread on the shank of the screw blank beyond the free faces of the washers to retain the screws and washers in permanently assembled relation.

9. A method of making unit assemblies of a screw and a washer comprising feeding to an assembly station a strip of washer material with washers formed therein, but partially attached thereto, feeding screw elements past the assembly station, at the assembly station temporarily holding a screw element while punching a washer from the strip and telescoping the washer with a screw element, and as the screw element with the washer temporarily held in assembled relation is fed from the assembly station, upsetting a portion of the shank of the screw element beyond the free face of the washer to retain the screw and washer in permanently assembled relation.

10. A machine for making unit assemblies of a threaded fastener and a washer comprising an assembly mechanism, means for feeding a washer strip to the assembly mechanism, means for feeding a fastener element to the assembly mechanism, said assembly mechanism including means for holding a fastener element, means for punching a washer from the strip for telescoping the washer with the fastener element held in the holding means and simultaneously releasing the fastener element from the holding means, and means for upsetting portions of the fastener elements beyond the free faces of the washers to retain the fastener elements and washers in assembled relation.

11. A machine for making unit assemblies of a headed fastener and a washer comprising an assembly mechanism, means for feeding to said assembly mechanism a strip of washer material with washers formed therein, but partially attached thereto, means for feeding headed fasteners to the assembly mechanism, said assembly mechanism comprising releasable means for holding a headed fastener, and means for simultaneously detaching a washer from the strip, telescoping the washer with the headed fastener held by the holding means and releasing the holding means, a mechanism for upsetting portions of the headed fasteners beyond the free faces of the washers to retain the fasteners and washers in assembled relation, and means for feeding the temporarily assembled fasteners and washers from the assembly mechanism to said upsetting mechanism, said last-mentioned feeding means including means for maintaining the fasteners and washers in temporarily assembled relation while being fed to the upsetting means.

12. A machine for making unit assemblies of a screw and a washer comprising means for partially forming washers from a strip of washer material, an assembly mechanism, means for feeding the strip of partially formed washers to the assembly mechanism, means for feeding screw elements to said assembly mechanism, said assembly mechanism including means for simultaneously completing the forming of the washers and telescoping the washers with the screw elements.

13. A machine for making unit assemblies of a screw and a washer, comprising mechanism forming washers from a strip of washer material with an outer edge portion of each washer partially secured to the strip, an assembly mechanism, means for feeding to the assembly mechanism the strip with the washers partially secured thereto, means for feeding screw elements to the assembly mechanism, said assembly mechanism including a punch for severing the partially secured washers from the strip and simultaneously telescoping the washers with screw elements.

14. A machine for making unit assemblies of a screw and a washer, comprising mechanism forming washers from a strip of washer material with an outer edge portion of each washer partially secured to the strip, an assembly mechanism, means for feeding to the assembly mechanism the strip with the washers partially secured thereto, means for feeding screw elements to the assembly mechanism, said assembly mechanism including a punch for severing the partially secured washers from the strip and simultaneously telescoping the washers with screw elements, and means for operating said punch and said strip feeding means in proper timed relation.

15. A machine for making unit assemblies of a screw and a washer, comprising mechanism forming washers from a strip of washer material with an outer edge portion of each washer partially secured to the strip, an assembly mechanism, means for feeding to the assembly mechanism the strip with the washers partially secured thereto, means for feeding screw elements to the assembly mechanism, said assembly mechanism including a punch for severing the partially secured washers from the strip and simultaneously telescoping the washers with screw elements, and means for feeding the screw elements and washers in temporarily assembled relation to a mechanism for enlarging the shanks of the screw elements beyond the free faces of the washers to retain the screws and washers in permanently assembled relation.

16. A machine for making unit assemblies of a screw and a washer comprising a mechanism for forming washers in a strip of washer material with an outer edge portion of each washer partially secured to the strip, an assembly mechanism, means for feeding a strip to the assembly mechanism, an inclined chute for feeding screw blanks to the assembly mechanism, said assembly mechanism including a pair of oppositely shiftable jaw members normally positioned to receive and hold the screw elements, a slidably mounted plunger for detaching washers from the strip and simultaneously telescoping the washers with the screw elements and releasing the jaw members from the screw elements, and means for operating said plunger.

17. A machine for making unit assemblies of a screw and a washer comprising a mechanism for forming washers in a strip of washer material with an outer edge portion of each washer partially secured to the strip, an assembly mechanism, means for feeding the strip to said assembly mechanism, an inclined chute for feeding screw elements to the assembly mechanism, said assembly mechanism comprising an apertured washer guide on one side of the strip, releasable means engaging the shank of a screw element to hold the screw element with its shank projecting into the aperture in said washer guide, a slidably mounted plunger movable from the opposite side of the strip through the strip to detach a washer from the strip and move it through the aperture in the washer guide onto the shank of the screw element, said screw element holding means being disposed to engage and be released by the washer as it is moved onto the shank of the screw element, and means for operating said plunger.

18. A machine for making unit assemblies of a screw and a washer comprising a mechanism for forming washers in a strip of washer material with an outer edge portion of each washer partially secured to the strip, an assembly mechanism, means for feeding the strip to said assembly mechanism, an inclined chute for feeding screw elements to the assembly mechanism, said assembly mechanism comprising an apertured washer guide on one side of the strip, releasable means engaging the shank of a screw element to hold the screw element with its shank projecting into the aperture in said washer guide, a slidably mounted plunger movable from the opposite side of the strip through the strip to detach a washer from the strip and move it through the aperture in the washer guide onto the shank of the screw element, said screw element holding means being disposed to engage and be released by the washer as it is moved onto the shank of the screw element, and means for intermittently operating said strip feeding means and said plunger in timed relation.

19. A method of making unit assemblies of a threaded fastener and a washer, comprising feeding a washer strip to an assembly station, and at the assembly station successively punching washers from the strip and telescoping the washers with fastener elements at the assembly station.

20. A machine for making unit assemblies of a threaded fastener and a washer comprising means for partially forming washers from a strip of washer material, an assembly mechanism, means for feeding the strip of partially formed washers to the assembly mechanism, means for feeding fastener elements to an assembly mechanism, said assembly mechanism including means for simultaneously completing the forming of the washers and telescoping the washers with the fastener elements.

21. A method of making unit assemblies of a screw element and a washer comprising feeding a strip of washer material with the washers attached to the strip along a predetermined path, along said path telescoping screw elements with the washers, and detaching the washers from the strip.

22. A method of making a permanently assembled unit of a screw element and a washer comprising feeding a strip of material with the washers attached to the strip along a predetermined path, along said path telescoping screw elements with the washers, detaching the washers from the strip, and enlarging a portion of the shank of each screw beyond the free face of the washer telescoped therewith to maintain the screws and washers in permanently assembled relation.

23. A method of making unit assemblies of a screw element and a washer comprising feeding a strip of washer material with the washers attached to the strip to an assembly station, at said station telescoping screw elements with the washers, and detaching the washers from the strip.

MORITZ K. NIELSEN.